(12) United States Patent
De Bernardi et al.

(10) Patent No.: US 9,551,351 B2
(45) Date of Patent: Jan. 24, 2017

(54) COMPRESSION DEVICE AND A THERMODYNAMIC SYSTEM COMPRISING SUCH A COMPRESSION DEVICE

(71) Applicant: DANFOSS COMMERCIAL COMPRESSORS, Trevoux (FR)

(72) Inventors: Jean De Bernardi, Lyons (FR); Patrice Bonnefoi, Saint Didier au Mont d'Or (FR); Xavier Durand, Saint Didier au Mont d'Or (FR); Fabien Gall, Cailloux sur Fontaines (FR); Jean-Francois Le Coat, Villefranche sur Saone (FR)

(73) Assignee: DANFOSS COMMERCIAL COMPRESSORS, Reyrieux (FR)

( * ) Notice: Subject to any disclaimer, the term of this patent is extended or adjusted under 35 U.S.C. 154(b) by 442 days.

(21) Appl. No.: 13/690,731

(22) Filed: Nov. 30, 2012

(65) Prior Publication Data

US 2013/0136622 A1 May 30, 2013

(30) Foreign Application Priority Data

Nov. 30, 2011 (FR) ...................... 11 60980

(51) Int. Cl.
*F04D 29/063* (2006.01)
*F04C 23/00* (2006.01)
(Continued)

(52) U.S. Cl.
CPC ......... *F04D 29/063* (2013.01); *F04B 39/0207* (2013.01); *F04B 39/0238* (2013.01);
(Continued)

(58) Field of Classification Search
CPC ..... F04B 39/02; F04B 39/0223; F04B 39/023; F04B 39/06; F04B 39/064; F04B 39/12; F04B 39/121; F04B 41/02; F04B 41/025; F04B 41/04; F04B 41/06; F04B 41/10; F04B 53/08; F04B 53/16; F04B 39/0238; F04B 49/02; F04D 29/063; F25B 2500/06; F25B 2500/16; F25B 2400/075; F25B 2600/0253; F25B 2700/03; F25B 2700/1932; F04C 2270/24
(Continued)

(56) References Cited

U.S. PATENT DOCUMENTS 3,386,262 A * 6/1968 Hackbart et al. ............... 62/469
5,787,728 A * 8/1998 Das et al. ...................... 62/503
(Continued)

FOREIGN PATENT DOCUMENTS

CN 1605818 A 4/2005
FR 2 605 393 A1 4/1988

*Primary Examiner* — William H Rodriguez
*Assistant Examiner* — Charles Nichols
(74) *Attorney, Agent, or Firm* — Oliff PLC

(57) ABSTRACT

A compression device includes a first compressor and a second compressor mounted in parallel, each compressor including a leakproof enclosure including a low pressure portion containing a motor and an oil sump, an oil level equalization conduit putting into communication the oil sumps of the first and second compressors, and control means adapted for controlling the starting and the stopping of the first and second compressors. The first compressor includes first detection means coupled with the control means and adapted for detecting an oil level in the oil sump of the first compressor. The control means are adapted for controlling the stopping of the second compressor when the oil level detected by the first detection means falls below a first predetermined value.

15 Claims, 2 Drawing Sheets

(51) Int. Cl.
  *F04C 28/02* (2006.01)
  *F04B 39/02* (2006.01)
  *F04B 41/06* (2006.01)
  *F04B 49/02* (2006.01)
  *F25B 31/00* (2006.01)
  *F04C 28/06* (2006.01)
  *F04C 29/02* (2006.01)

(52) U.S. Cl.
  CPC .............. *F04B 41/06* (2013.01); *F04B 49/02* (2013.01); *F04C 23/001* (2013.01); *F04C 23/008* (2013.01); *F04C 28/02* (2013.01); *F04C 28/06* (2013.01); *F25B 31/004* (2013.01); *F04C 29/021* (2013.01); *F04C 2270/24* (2013.01); *F25B 2400/075* (2013.01); *F25B 2600/0253* (2013.01); *F25B 2700/03* (2013.01)

(58) Field of Classification Search
  USPC ............................................ 417/538; 62/510
  See application file for complete search history.

(56) References Cited

U.S. PATENT DOCUMENTS

| | | | |
|---|---|---|---|
| 6,125,642 A * | 10/2000 | Seener et al. | 62/193 |
| 6,488,120 B1 * | 12/2002 | Longsworth | 184/6.17 |
| 6,962,058 B2 * | 11/2005 | Kim et al. | 62/175 |
| 7,137,265 B2 | 11/2006 | Kim | |
| 2009/0007588 A1 * | 1/2009 | Shaw | F04B 39/0207 62/470 |
| 2009/0235678 A1 * | 9/2009 | Taras et al. | 62/115 |
| 2010/0202909 A1 * | 8/2010 | Shiotani et al. | 418/3 |
| 2011/0211973 A1 * | 9/2011 | Lee et al. | 417/13 |

\* cited by examiner

COMPRESSION DEVICE AND A THERMODYNAMIC SYSTEM COMPRISING SUCH A COMPRESSION DEVICE

The present invention relates to a compression device, a thermodynamic system comprising such a compression device, and to a method for controlling the oil supply in such a compression device.

Document FR 2 605 393 describes a thermodynamic system, and more particularly a refrigeration system, comprising:
- a circuit for circulating a coolant fluid, successively including a condenser, an expansion valve, an evaporator and a compression device connected in series, the compression device comprising at least a first compressor with a fixed capacity and a second compressor with a fixed capacity mounted in parallel, each compressor comprising an enclosure including a low pressure portion containing a motor and an oil sump positioned in the bottom of the enclosure on the one hand, and an orifice for admitting coolant fluid opening into the low pressure portion on the other hand,
- a suction line connected to the evaporator,
- a first suction conduit putting the suction line in communication with the admission orifice of the first compressor,
- a second suction conduit putting the suction line in communication with the admission orifice of the second compressor,
- a throttling member positioned in the second suction conduit and adapted for maintaining pressure in the low pressure portion of the first compressor greater than the pressure in the low pressure portion of the second compressor when the first and second compressors are operating simultaneously,
- a device for separating flows positioned between the suction line and the first and second suction conduits, the flow separation device being adapted so as to drive the major portion of the coolant fluid from the evaporator towards the first compressor, and
- an oil level equalization conduit promoting transfer of oil between both compressors.

Such a thermodynamic system ensures return of the major portion of the oil driven by the coolant fluid towards the first compressor. Because of the high pressure prevailing in the low pressure portion of the first compressor (due to the presence of the throttling member in the second suction conduit), the oil present in the oil sump of the first compressor is driven towards the oil sump of the second compressor, via the oil level equalization conduit, so as to balance the oil levels in the first and second compressors.

Such a solution, although satisfactory for a thermodynamic system including two fixed-capacity compressors, having close capacities, is absolutely not satisfactory for a thermodynamic system including at least one compressor with variable capacity, and more particularly with a variable speed, or two fixed-capacity compressors, having very different capacities.

Indeed, when the compressor with variable speed is operating at a low speed, for example of less than or of the order of 30 Hz, for a certain period of time and the second compressor is operating, a pressure unbalance between the oil sumps of both compressors is established causing a transfer of the majority of the oil from the evaporator towards the second compressor, and therefore a significant increase in the oil level in the oil sump of the second compressor and depletion of oil in the oil sump of the first compressor which may lead to significant damaging of the latter.

The same applies when both compressors are with fixed capacity and the second compressor has a much larger capacity than that of the first compressor.

Therefore, the solution mentioned earlier does not give the possibility of obtaining satisfactory balancing of the oil levels regardless of the type of compressors used, and regardless of the operating conditions of the latter.

The present invention aims at finding a remedy to these drawbacks.

The technical problem at the basis of the invention therefore consists of providing a compression device which is of a simple and economical structure, with which balancing of the oil levels in each compressor may be obtained regardless of the operating conditions of the compression device and regardless of the type of compressors used.

For this purpose, the present invention relates to a compression device comprising:
- at least a first compressor and a second compressor mounted in parallel, each compressor comprising a leakproof enclosure including a low pressure portion containing a motor and an oil sump,
- an oil level equalization conduit putting into communication the oil sumps of the first and second compressors,
- control means adapted for controlling the starting and the stopping of the first and second compressors, characterized in that the first compressor is a variable-capacity compressor and the second compressor is a fixed-capacity compressor, in that the first compressor comprises first detection means coupled with the control means and adapted for detecting an oil level in the oil sump of the first compressor, and in that the control means are adapted for controlling the stopping of the second compressor and an increase in the capacity of the first compressor when the oil level detected by the first detection means falls below a first predetermined value.

Thus, when the oil level in the oil sump of the first compressor is lowered or falls below a critical value, the second compressor is stopped, which has the consequence of increasing the pressure in the oil sump of the second compressor and of causing forced return of oil into the oil sump of the first compressor from the oil sump of the second compressor via the oil level equalization conduit.

The compression device according to the invention therefore ensures balancing of the oil levels in each compressor regardless of the operating conditions of the compression device, and regardless of the type of compressors used, all of this with simple low cost means for oil level detection. Further, the compression device according to the invention ensures the presence of a minimum amount of oil in the oil sump of the first compressor.

Further, such a combination of detection means and of control means ensures balancing of the oil levels in the first and second compressors regardless of the configuration of the suction line and of the suction conduits, which substantially reduces the duration of the process for qualification of the device and allows the use of any tubing.

Furthermore, by positioning the detection means on the first compressor, it is possible to protect the most expensive compressor of the compression device and most subject to pressure variations in its oil sump.

The control means are advantageously adapted for controlling the temporary stopping of the second compressor when the oil level detected by the first detection means falls below the first predetermined value.

The first detection means are preferably adapted for transmitting to the control means a measurement signal corresponding to the detected oil level.

The control means include signal processing means such as a microprocessor, adapted so as to process each measurement signal generated by the detection means and for transmitting a signal for controlling the stopping of the second compressor when the oil level detected by the first detection means falls below a first predetermined value. The processing means are more particularly adapted for transmitting a signal for controlling the stopping of the motor of the second compressor when the oil level detected by the first detection means falls below the first predetermined value.

The first detection means are for example either coupled by wire or not with the control means. Thus, the first detection means may for example be electrically coupled or coupler via Wifi or Bluetooth to the control means.

The first detection means for example include at least an oil level sensor or an oil level contactor.

By a variable-capacity compressor is meant any compressor which may have variable flow rate (or several flow rates) upon suction from the compressor for a same operating point (an operating point corresponding to a given suction pressure, suction temperature and discharge pressure). Among the technical solutions known for making a variable-capacity compressor, mention will for example be made of:
  a compressor driven by a variable-speed motor,
  a compressor driven by a motor with two speeds (a two/four pole motor type),
  a compressor driven by a fixed-speed motor plus a gearbox,
  a compressor driven by a fixed-speed motor plus an epicycloidal gear (planetary gear),
  a compressor with discharge valves either opening or closing an internal bypass to the compressor,
  a compressor with multiple compression units, some of which may be decoupled,
  a compressor with an internal mechanism for generating intermittent compression.

Advantageously, the control means are adapted so as to control the restarting of the second compressor when a predetermined condition is met after the second compressor has stopped, due to the detection of an oil level below the first predetermined value.

According to a first alternative embodiment of the invention, the control means are adapted so as to control the restarting of the second compressor after a predetermined time period has elapsed. The predetermined time period may be of the order of a few seconds, for example 2 to 3 seconds, or at least less than a few minutes and for example less than 1 minute.

According to a second alternative embodiment of the invention, the control means are adapted for controlling the restarting of the second compressor when the oil level detected by the first detection means attains a second predetermined value superior to the first predetermined value.

According to a third alternative embodiment of the invention, the compression device comprises second detection means adapted for detecting an oil level in the oil sump of the second compressor, the control means being adapted so as to control the restarting of the second compressor when the oil level detected by the second detection means attains a third predetermined value.

According to a first embodiment of the invention, the control means are adapted for controlling an increase in the capacity of the first compressor up to a maximum capacity value when the oil level detected by the first detection means falls at least twice below the first predetermined value within a predetermined time period. According to a second embodiment of the invention, the control means are adapted for controlling an increase in the capacity of the first compressor up to a maximum capacity value when the oil level detected by the first detection means falls below the first predetermined value within a predetermined time period starting from the restarting of the second compressor after the second compressor has stopped due to the detection of an oil level below the first predetermined value. According to these first and second embodiments of the invention, the significant increase in the capacity of the first compressor causes significant return of the oil trapped in the circulation circuit of the thermodynamic system towards the compression device and ensures a satisfactory oil level in each of the first and second compressors.

However, in the case of a significant oil leak in the thermodynamic system, even a significant increase in the capacity of the first compressor cannot be sufficient for ensuring a satisfactory return of oil towards the compression device. In order to overcome such a drawback, the compression device may comprise alarm means adapted for emitting an alarm signal when the oil level detected by the first detection means falls at least twice below the first predetermined value within a predetermined time period, or when the oil level detected by the first detection means falls below the first predetermined value with a predetermined time period from the restarting of the second compressor after the second compressor has stopped due to the detection of an oil level below the first predetermined value. Thus, the central automaton of the thermodynamic system and/or an operator may be informed on a fault in the compression device, and make the decision of stopping the thermodynamic system in order to avoid any damaging of the latter.

Preferably, the oil level equalization conduit includes at least a first end portion protruding inside the enclosure of one of the first and second compressors, the first end portion including an end wall extending transversely to the longitudinal direction of said first end portion and an aperture arranged above said end wall, so that, when the oil level in the oil sump of the compressor into which protrudes the first end portion, extends above the upper level of said end wall, oil flows through said aperture towards the other compressor. Preferably, the first end portion protrudes inside the enclosure of the second compressor.

The oil level equalization conduit advantageously includes a second end portion protruding inside the enclosure of the other one of the first and second compressors, the second end portion including an end wall extending transversely to the longitudinal direction of said second end portion and an aperture arranged above the end wall of said second end portion so that, when the oil level in the oil sump of the compressor into which protrudes the second end portion, extends above the upper level of the end wall of the second end portion, oil flows through the aperture of the second end portion towards the other compressor.

According to an embodiment of the invention, at least one of the first and second end portions includes an orifice for return of oil located below the upper level of the end wall of said end portion.

Each of the first and second compressors is for example a scroll compressor.

Preferably each compressor includes an orifice for admitting a coolant fluid, opening into the low pressure portion of said compressor.

According to an embodiment of the invention, the compression device comprises a suction line intended to be connected to an evaporator, a first suction conduit putting the suction line in communication with the coolant fluid admission orifice of the first compressor, and a second suction conduit putting the suction line in communication with the coolant fluid admission orifice of the second compressor.

According to an embodiment, the second suction conduit comprises means for reducing the flow section of the coolant fluid in said second suction conduit. Advantageously, the reduction means are adapted so that the flow section of the coolant fluid at the reduction means is smaller than the flow section of the coolant fluid at the admission orifice of the second compressor.

According to an embodiment of the invention, the compression device may comprise a plurality of second compressors, and a pressure equalization conduit adapted for connecting the low pressure portions of the second compressors.

The present invention also relates to a thermodynamic system comprising a circuit for circulating a coolant fluid successively including a condenser, an expansion valve, an evaporator and a compression device according to the invention connected in series.

The present invention further relates to a method for controlling the oil supply in a compression device comprising at least one first compressor and one second compressor mounted in parallel, each compressor comprising a leak-proof enclosure including a low pressure portion containing a motor and an oil sump, the first compressor being a variable-capacity compressor, the control method comprising the steps:

controlling the starting of the first and second compressors, detecting an oil level in the oil sump of the first compressor, and controlling the stopping of the second compressor and increasing the capacity of the first compressor, for example up to a predetermined capacity value, when the oil level detected in the oil sump of the first compressor falls below a first predetermined value.

With these arrangements, it is possible to promote the return of oil towards the oil sump of the first compressor, while at least partly compensating for the loss of capacity of the compression device due to the stopping of the second compressor.

The detection step is preferably carried out with detection means positioned on the first compressor.

Advantageously, the step for controlling the stopping of the second compressor consists of controlling the temporary stopping of the second compressor.

The control method advantageously comprises a step for controlling the restarting of the second compressor when a predetermined condition is met after the second compressor has stopped due to the detection of an oil level below the first predetermined value.

The predetermined condition may be an elapse of a predetermined time period, or further a detection of a second predetermined value of the oil level in the oil sump of the first compressor, the second predetermined value being greater than the first predetermined value.

The control method advantageously further comprises a step consisting of maintaining the capacity of the first compressor to a predetermined capacity value until the predetermined condition is met.

The control method advantageously further comprises a step consisting of reducing the capacity of the first compressor when the predetermined condition is met so that the capacity of the compression device corresponds to the actual cold demand.

According to a first embodiment of the invention, the control method comprises a step consisting of controlling an increase in the capacity of the first compressor up to a maximum capacity value when the oil level detected in the oil sump of the first compressor falls at least twice below the first predetermined value within a predetermined time period. According to a second embodiment of the invention, the control method comprises a step consisting of controlling an increase in the capacity of the first compressor up to a maximum capacity value when the oil level detected in the oil sump of the first compressor falls below the first predetermined value within a predetermined time period starting from the restarting of the second compressor after the second compressor has stopped due to detection of an oil level below the first predetermined value. In these first and second embodiments, the method further comprises a step for maintaining the capacity of the first compressor to the maximum capacity value for a predetermined time period.

According to an embodiment of the invention, the control method comprises a step consisting of emitting an alarm signal when the oil level detected in the oil sump of the first compressor falls at least twice below the first predetermined value within a predetermined time period, or when the oil level detected in the oil sump of the first compressor falls below the first predetermined value within a predetermined time period starting from the restarting of the second compressor after the second compressor has stopped due to the detection of an oil level below the first predetermined value.

Anyway, the invention will be well understood by means of the description which follows with reference to the appended schematic drawing illustrating as a non-limiting example, an embodiment of this compression device.

Figure 1:
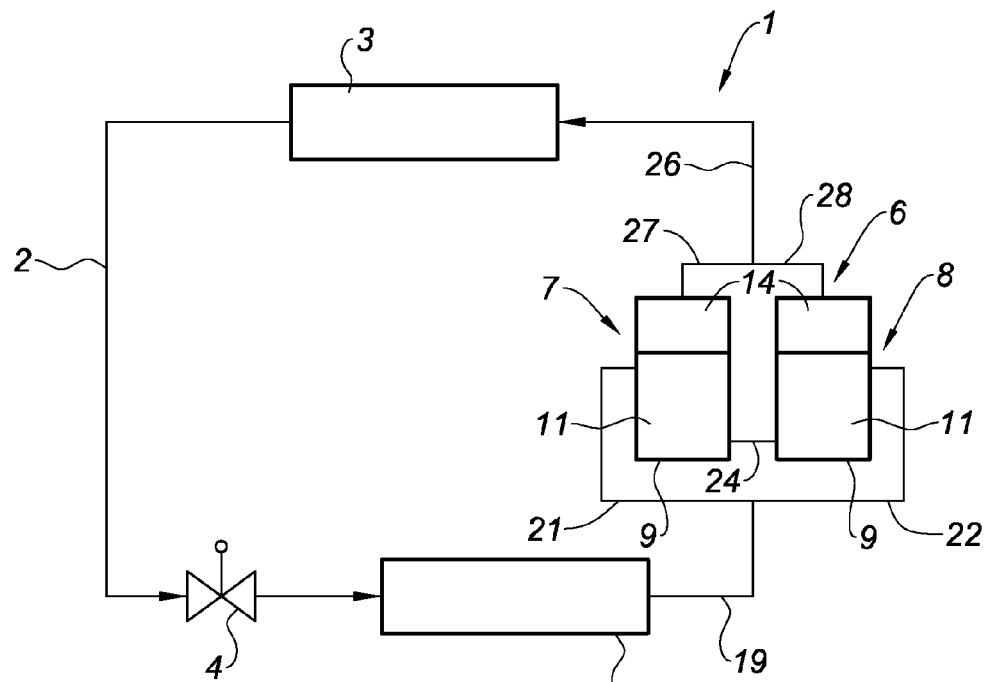
FIG. 1 is a schematic view of a thermodynamic system according to the invention.
Figure 2:
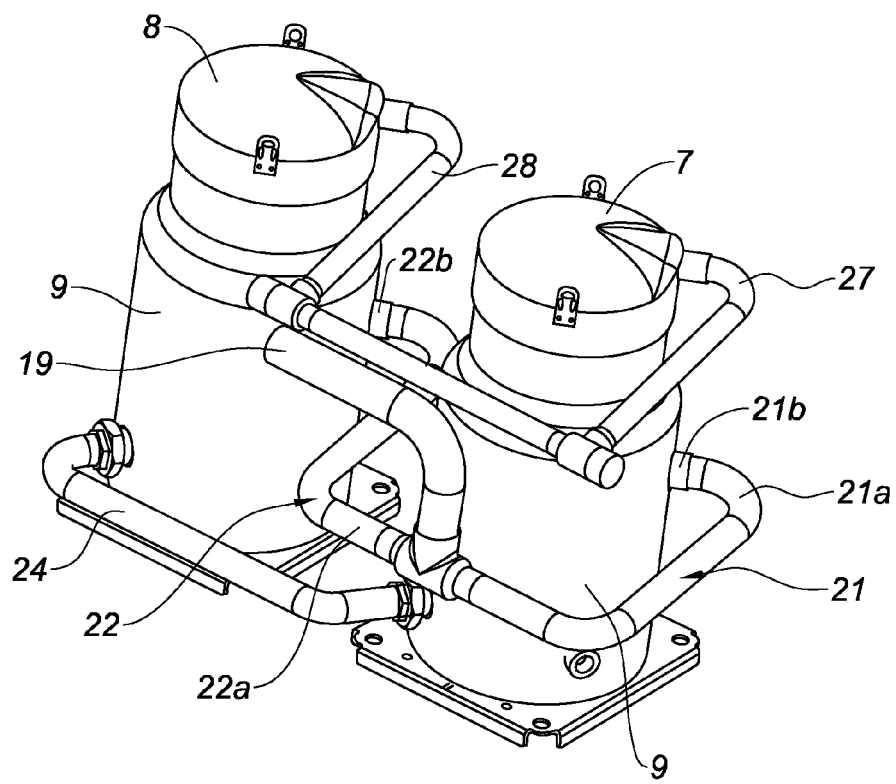
FIG. 2 is a perspective view of a compression device of the thermodynamic system of FIG. 1.

FIG. 1 schematically illustrates the main components of a thermodynamic system 1. The thermodynamic system 1 may be a refrigeration system, such as a reversible refrigeration system.

The thermodynamic system 1 comprises a circuit 2 for circulating a coolant fluid successively including a condenser 3, an expansion valve 4, an evaporator 5 and a compression device 6 connected in series.

The compression device 6 comprises a first compressor 7 with variable capacity and more particularly with variable speed, and a second compressor 8 with fixed capacity and more particularly with fixed speed, mounted in parallel. Each compressor 7, 8 is for example a scroll compressor.

Each compressor 7, 8 comprises a body 9 including a low pressure portion 11 containing a motor 12 and an oil sump 13 positioned in the bottom of the body 9, and a high pressure portion 14, positioned above the low pressure portion 11, containing a compression stage.

The body 9 of each compressor 7, 8 further includes an orifice 15 for admitting coolant fluid opening into an upper portion of the low pressure portion 11, an equalization orifice 16 opening into the oil sump 13, and a discharge orifice 17 opening into the high pressure portion 14.

The compression device 6 also comprises a suction line 19 connected to the evaporator 5, a first suction conduit 21 putting the suction line 19 in communication with the admission orifice 15 of the first compressor 7, and a second suction conduit 22 putting the suction line 19 in communication with the admission orifice 15 of the second compressor 8. Each suction conduit 21, 22 respectively comprises a suction tube 21a, 22a connected to the suction line 19 and a connecting sleeve 21b, 22b connected to the corresponding admission orifice 15.

Figure 3:
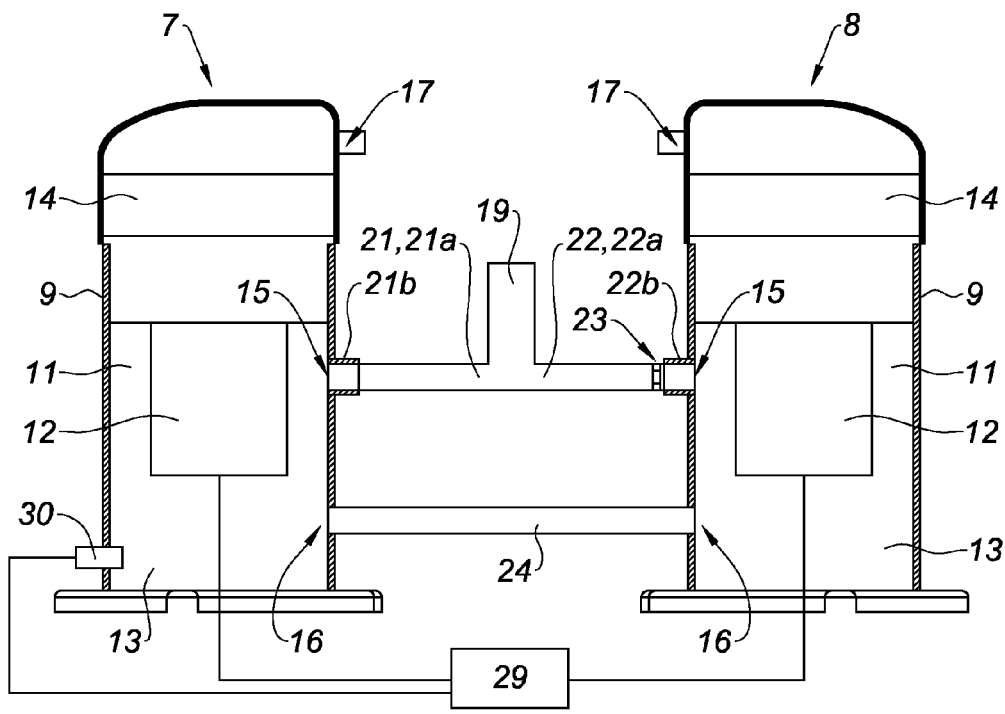
FIG. 3 is a schematic sectional view of the compression device of FIG. 2.

As shown in FIG. 3, the second suction conduit 22 comprises means for reducing the flow section of the coolant gas in said suction conduits. The reduction means are adapted so that the flow section of the coolant gas at the reduction means is smaller than the flow section of the coolant gas at the admission orifice 15 of the second compressor 8. The reduction means are advantageously positioned in proximity to the admission orifice 15 of the said compressor 8.

The reduction means preferably comprise an annular ring 23 attached in the second suction conduit 22, for example by brazing or crimping. The annular ring 23 includes a longitudinal through-orifice centered relatively to the wall of the second suction conduit 22. It should be noted that the outer diameter of the annular ring 23 substantially corresponds to the inner diameter of the bypass 22a of the second suction conduit 22.

According to an alternative embodiment not shown in the figures, the annular ring 23 may be attached in the connecting sleeve 22b of the second suction conduit 22.

The compression device 6 further comprises an oil level equalization conduit 24 connecting the first equalization orifices 16 of the first and second compressors 7, 8 and consequently putting the oil sumps 13 of the first and second compressors in communication.

The compression device 6 also comprises a discharge line 26 connected to the condenser 3, a first discharge conduit 27 putting the discharge line 26 in communication with the discharge orifice 17 of the first compressor 7, and a second discharge conduit 28 putting the discharge line 26 in communication with the discharge orifice 17 of the second compressor 8.

The compression device 6 further comprises control means 29 adapted for selectively controlling the respective switching of the first and second compressors 7, 8 between an operating mode and a stopping mode on the one hand, and for modulating the speed of the motor 12 of the first compressor 7 between a minimum speed and a maximum speed on the other hand.

The first compressor 7 comprises detection means 30 adapted for detecting an oil level in the oil sump 13 of the first compressor 7. The detection means 30 for example include an oil level sensor or an oil level contactor. The detection means 30 are coupled with the control means 29 for example either by wire or not. Thus, the detection means 30 may for example be electrically coupled or via Wifi or Bluetooth with the control means 29.

The detection means 30 are adapted for transmitting to the control means 29 a measurement signal corresponding to the detected oil level. The control means 29 include signal processing means, such as a microprocessor, adapted for processing each measurement signal generated by the detection means 30 and for emitting a signal for controlling the stopping of the motor 12 of the second compressor 8 when the oil level detected by the detection means 30 falls below the first predetermined value.

The control means 29 are further adapted for controlling the restarting of the second compressor 8 when a predetermined condition is met after the second compressor 8 has stopped due to the detection of an oil level below the first predetermined value. The predetermined condition may be an elapse of a predetermined time period, or further a detection of a second predetermined value of the oil level by the detection means 30, the second predetermined value being greater than the first predetermined value.

The control means 29 are also adapted for controlling an increase in the speed of the first compressor 7 up to a predetermined speed value when the oil level detected by the detection means 30 falls below the first predetermined value, and for maintaining the speed of the first compressor 7 to the predetermined speed value until the predetermined condition is met.

According to a first embodiment of the invention, the control means 29 are adapted for controlling an increase in the speed of the first compressor 7 up to the maximum speed of the latter when the oil level detected by the detection means 30 falls at least twice below the first predetermined value for a predetermined time period.

According to a second embodiment of the invention, the control means 29 are adapted for controlling an increase in the speed of the first compressor 7 up to the maximum speed of the latter when the oil level detected by the detection means 30 falls below the first predetermined value within a predetermined time period starting from the restarting of the second compressor 8 after the latter has stopped due to the detection of an oil level below the first predetermined value.

The compression device 6 may also comprise alarm means adapted for emitting an alarm signal when the oil level detected by the detection means 30 falls at least twice below the thrust predetermined value within a predetermined time period, or when the oil level detected by the detection means 30 falls below the first predetermined value within a predetermined time period starting from the restarting of the second compressor 8, after the latter has stopped, due to the detection of an oil level below the first predetermined value.

Figure 4A:
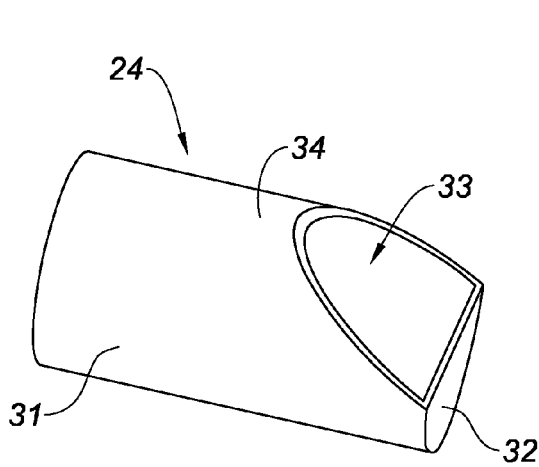
FIGS. 4a and 4b are respectively perspective and top views of an end portion of an oil level equalization conduit of the compression device of FIG. 2.
Figure 4B:
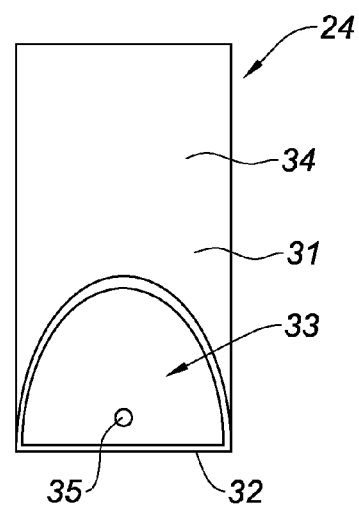

According to an alternative embodiment of the compression device 6 illustrated in FIGS. 4a and 4b, the oil level equalization conduit 24 includes two end portions 31 respectively protruding inside the enclosure 9 of the first compressor 7 and inside the enclosure 9 of the second compressor 8. Each end portion 31 includes an end wall 32 extending transversely to the longitudinal direction of said end portion 31 and an aperture 33 made above the end wall 32 so that when the oil level in the oil sump 13 of the compressor, into which opens said end portion 31, extends above the upper level of the end wall 32, oil flows through the aperture 33 towards the other compressor. Preferably each aperture 33 extends over a portion of the side wall 34 of the corresponding end portion 31.

Each end portion 31 further includes an oil return orifice 35 located below the upper level of the end wall 32 offset in portion 31. This position of each oil return orifice 35 gives the possibility of avoiding storage of oil beyond a predetermined level inside the enclosure of each compressor 7, 8.

The method for controlling the oil supply in the compression device 6 according to the invention will now be described. The control method comprises the steps:

controlling the starting of the first and second compressors 7, 8 with the control means 29, detecting an oil level in the oil sump 13 of the first compressor 7 with detection means 30, controlling temporary stopping of the second compressor 8 and increasing the speed of the first compressor 7 with the control means 29 when the oil level detected in the oil sump 13 of the first compressor 7 falls below the first predetermined value, maintaining the speed of the first compressor 7 to a predetermined speed value until the predetermined condition is met, and controlling the restarting of the second compressor 8 and reducing the speed of the first compressor 7 with the control means 29 when the predetermined condition is met.

The control method may further comprise a step for controlling an increase in the speed of the first compressor 7 up to the maximum speed of the latter when the oil level detected by the first detection means 30 falls at least twice below the first predetermined value within a predetermined time period, or when the oil level detected by the first detection means 30 falls below the first predetermined value within a predetermined time period starting from the restarting of the second compressor 8 after the latter has stopped due to the detection of an oil level below the first predetermined value. The control method then also comprises a step for maintaining the maximum speed of the first compressor 7 for a predetermined time period.

The control method may also comprise a step for emitting an alarm signal when the oil level detected in the oil sump 13 of the first compressor 7 falls at least twice below the first predetermined value within a predetermined time period, or when the oil level detected in the oil sump 13 of the first compressor 7 falls below the first predetermined value within a predetermined time period starting from the restarting of the second compressor 8 after the latter has stopped due to the detection of an oil level below the first predetermined value.

As this is obvious, the invention is not limited to the sole embodiment of this compression device, described above as an example, it encompasses on the contrary all the alternative embodiments thereof.

The invention claimed is:

1. A compression device comprising:
   at least a first compressor and a second compressor mounted in parallel, each of the first compressor and the second compressor comprising a leakproof enclosure including a low pressure portion containing a motor and an oil sump,
   an oil level equalization conduit putting into communication the oil sump of the first compressor and the oil sump of the second compressor, the oil level equalization conduit including a first end portion connected to the oil sump of the first compressor and a second end portion connected to the oil sump of the second compressor, the oil level equalization conduit being configured to equalize oil levels in the oil sump of the first compressor and the oil sump of the second compressor, and
   a controller configured to control starting and stopping of the first compressor and the second compressor,
   wherein
   the first compressor is a variable-capacity compressor, and the second compressor is a fixed-capacity compressor,
   the first compressor comprises a first detector coupled with the controller, the first detector being configured to detect an oil level in the oil sump of the first compressor,
   the controller is configured to (i) control the stopping of the second compressor when the oil level in the oil sump of the first compressor detected by the first detector falls below a first predetermined value, and (ii) control an increase in capacity of the first compressor when the oil level in the oil sump of the first compressor detected by the first detector falls below the first predetermined value, and
   wherein the oil level equalization conduit includes at least a first end portion protruding inside the enclosure of a first one of the first compressor and the second compressor, the first end portion including an end wall extending transversely to a longitudinal direction of said first end portion and an aperture arranged above said end wall so that, when the oil level in the oil sump of the compressor in which the first end portion protrudes extends above an upper level of said end wall, oil flows through said aperture towards a second one of the first compressor and the second compressor.

2. The compression device according to claim 1, wherein the controller is configured to control restarting of the second compressor when a predetermined condition is met after stopping the second compressor due to the detection of the oil level below the first predetermined value.

3. The compression device according to claim 2, wherein the controller is configured to control the restarting of the second compressor after elapse of a predetermined time period.

4. The compression device according to claim 3, wherein the controller is configured to control the restarting of the second compressor when the oil level detected by the first detector attains a second predetermined value greater than the first predetermined value.

5. The compression device according to claim 1, wherein the oil level equalization conduit includes a second end portion protruding inside the enclosure of the second one of the first compressor and the second compressor, the second end portion including an end wall extending transversely to a longitudinal direction of said second end portion and an aperture arranged above the end wall of said second end portion so that, when the oil level in the oil sump of the compressor into which the second end portion protrudes extends above an upper level of the end wall of the second end portion, oil flows through the aperture of the second end portion towards the first one of the first compressor and the second compressor.

6. The compression device according to claim 5, wherein at least one of the first end portion and the second end portion includes an oil return orifice located below the upper level of the end wall of said one of the first end portion and the second end portion.

7. A thermodynamic system, comprising a circuit for circulating a coolant fluid, successively including a condenser, an expansion valve, an evaporator, and the compression device according to claim 1, connected in series.

8. A method for controlling the oil supply in the compression device according to claim 1, the control method comprising:
   controlling starting of the first compressor and the second compressor,
   detecting an oil level in the oil sump of the first compressor, controlling stopping of the second compressor when the oil level detected in the oil sump of the first compressor falls below a first predetermined value, and increasing a capacity of the first compressor when the oil level detected in the oil sump of the first compressor falls below the first predetermined value.

9. The control method according to claim 8, further comprising:

controlling restarting of the second compressor when a predetermined condition is met after the second compressor has stopped due to the detection of the oil level below the first predetermined value.

10. The control method according to claim 9, wherein the predetermined condition is an elapse of a predetermined time period.

11. The control method according to claim 9, wherein the predetermined condition is a detection of a second predetermined value of the oil level in the oil sump of the first compressor, the second predetermined value being greater than the first predetermined value.

12. The control method according to claim 9, further comprising:

reducing the capacity of the first compressor when the predetermined condition is met.

13. The compression device according to claim 1, wherein the oil level equalization conduit is configured to permit bi-directional fluid flow between the oil sump of the first compressor and the oil sump of the second compressor.

14. The compression device according to claim 1, wherein the oil level equalization conduit is configured to equalize oil levels in the oil sump of the first compressor and the oil sump of the second compressor under all operating conditions of the compression device.

15. The compression device according to claim 10, wherein the oil level equalization conduit is configured to equalize oil levels in the oil sump of the first compressor and the oil sump of the second compressor under all operating conditions of the compression device.

* * * * *